(12) United States Patent
Ferren et al.

(10) Patent No.: US 7,230,639 B2
(45) Date of Patent: *Jun. 12, 2007

(54) METHOD AND APPARATUS FOR SELECTION OF SIGNALS IN A TELECONFERENCE

(75) Inventors: Bran Ferren, Beverly Hills, CA (US); W. Daniel Hillis, Encino, CA (US); Mark E. Duttweiler, La Crescenta, CA (US); Russel Howe, Montrose, CA (US)

(73) Assignee: Applied Minds, Inc., Glendale, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 10/884,281

(22) Filed: Jul. 2, 2004

(65) Prior Publication Data

US 2004/0233273 A1    Nov. 25, 2004

Related U.S. Application Data

(63) Continuation of application No. 10/327,368, filed on Dec. 20, 2002, now Pat. No. 6,812,956.

(51) Int. Cl.
*H04N 7/14* (2006.01)

(52) U.S. Cl. .............................. 348/14.08; 348/14.09; 348/14.11

(58) Field of Classification Search .. 348/14.01–14.09, 348/14.1, 14.11, 14.12, 14.13, 14.16, 64, 348/71; 370/260, 261; 379/93.17, 202.01
See application file for complete search history.

(56) References Cited

U.S. PATENT DOCUMENTS

| 4,264,928 | A | 4/1981 | Schober |
| 4,449,238 | A | 5/1984 | Lee et al. |
| 4,456,789 | A | 6/1984 | Grovesy et al. |
| 4,516,156 | A | 5/1985 | Fabris et al. |
| 4,577,344 | A | 3/1986 | Warren et al. |
| 4,645,872 | A | 2/1987 | Pressman |
| 4,658,425 | A | 4/1987 | Julstrom |

(Continued)

FOREIGN PATENT DOCUMENTS

FR    002776457 A1 *    9/1999

(Continued)

OTHER PUBLICATIONS

Inque, T..; Effects of Video Expression in Videoconferencing: 1999; IEEE.

(Continued)

*Primary Examiner*—Melur Ramakrishnaiah
(74) *Attorney, Agent, or Firm*—Michael A. Glenn; Glenn Patent Group

(57) ABSTRACT

A method and apparatus for providing appropriate output signals to output devices in a teleconference setting is disclosed. Input signals are obtained from input devices, and descriptive information describing the teleconference is received from several sensors. On a substantially continuous basis, using the descriptive information, a desirability is computed for each of several possible output configurations, each output configuration specifying a routing of output signals to output devices. The most desirable output configuration is then selected, and output signals are provided to output devices as specified by the selected output configuration.

79 Claims, 5 Drawing Sheets

U.S. PATENT DOCUMENTS

| | | | |
|---|---|---|---|
| 4,961,211 A * | 10/1990 | Tsugane et al. | 348/14.08 |
| 5,003,532 A | 3/1991 | Ashida et al. | |
| 5,315,633 A | 5/1994 | Champa | |
| 5,426,510 A | 6/1995 | Meredith | |
| 5,495,522 A | 2/1996 | Allen et al. | |
| 5,686,957 A | 11/1997 | Baker | |
| 5,764,279 A * | 6/1998 | Ford et al. | 348/14.08 |
| 5,828,838 A | 10/1998 | Downs et al. | |
| 5,953,050 A | 9/1999 | Kamata et al. | |
| 5,959,667 A | 9/1999 | Maeng | |
| 5,991,277 A | 11/1999 | Maeng et al. | |
| 6,025,870 A | 2/2000 | Hardy | |
| 6,163,798 A | 12/2000 | Frank | |
| 6,181,784 B1 | 1/2001 | Duran et al. | |
| 6,192,342 B1 | 2/2001 | Akst | |
| 6,346,963 B1 * | 2/2002 | Katsumi | 348/14.09 |
| 6,346,964 B1 * | 2/2002 | Rogers et al. | 348/14.11 |
| 2002/0105598 A1 | 8/2002 | Tal et al. | |
| 2002/0122112 A1 | 9/2002 | Mallart et al. | |
| 2003/0217333 A1 | 3/2003 | Kenoyer et al. | |

FOREIGN PATENT DOCUMENTS

| | | | |
|---|---|---|---|
| JP | 403229587 A * | 10/1991 | |
| JP | 406133084 A * | 5/1994 | |
| JP | 08-130590 | 5/1996 | |

OTHER PUBLICATIONS

Inoue, T.; Learning from TV Programs: Application of TV Presentation to a Videoconferencing System; 1995; Kejo University.

Simplify & Enhance Our Videoconferences with the Dolman System. No date is available.

The CT-4A Automatic Audio Mixer; www.javs.com/courts/systems/ct4a.html. No date is available.

Polycom ViewStation MP; www.picturephone.com/products/polycom_mp.htm; No date is available.

* cited by examiner

METHOD AND APPARATUS FOR SELECTION OF SIGNALS IN A TELECONFERENCE

CROSS-REFERENCE TO RELATED APPLICATIONS

This application is a Continuation application of U.S. Ser. No. 10/327,368, filed Dec. 20, 2002, now U.S. Pat. No. 6,812,956.

TECHNICAL FIELD

The invention relates to teleconferencing. More particularly, the invention relates to a method and apparatus for selecting signals in a teleconference.

DESCRIPTION OF THE PRIOR ART

The primary goal of teleconferencing systems is to provide, at a remote teleconference site, a high fidelity representation of the persons present and of events occurring at a local teleconference site. A teleconferencing system that represents the local conferencing site with sufficient fidelity enables effective communication and collaboration among the participants despite their physical separation.

In practice, it is difficult to capture the persons and events at a local conferencing site effectively using a single video feed from a single video camera and a single audio feed from a single microphone. This is especially true in conferences with more than one local conferencing participant. While employing a single camera with a wide-angle view of a local conferencing site may successfully capture more than one participant within the camera field of view, such views create a sense of distance that is neither comfortable nor engaging for the remote participant.

Several prior art video conferencing systems, including the Viewstation MP, manufactured by Polycom, Inc. of Pleasanton, Calif., have attempted to mitigate this shortcoming with a motion control video camera. The camera automatically tracks a single video conferencing participant or pans and tilts to capture multiple participants, successively, within the field of view. While this approach does provide a closer view of individual participants, the moving view captured by a panning and tilting camera as it transitions from one participant to another is disconcerting when viewed by the remote participant.

To avoid the panning and tilting motion provided by motion control cameras, several prior art conferencing systems, including the CT-4A Automatic Mixer, manufactured by Jefferson Audio Systems of Louisville, Ky., have incorporated video feeds from multiple video cameras, and audio feeds from multiple microphones. In addition, many systems allow for the transmission of video and audio feeds from sources such as laptop computers, document cameras, and video cassette recorders.

Because a teleconferencing system must operate within the limited bandwidth connecting a local and remote location, it is in practice not possible to transmit all of the audio and video signals to the remote location. Moreover, the amount of visual and aural information the remote participant can comfortably process is itself limited. It is therefore desirable to determine, among the many video and audio feeds available at the local conferencing site, which feed or feeds to transmit to the remote location.

Several prior art approaches, including U.S. Pat. No. 6,025,870 to Hardy have suggested that the selection of the video and audio signals may be performed in a manner that simulates the shift in attention of an observer physically present at the local site. For example, the selected video signal may be obtained from a video camera offering a prominent view of the current speaker, and the selected audio signal may be obtained from a microphone offering the clearest rendering of the current dialogue. Providing video and audio signals to the remote participant in this manner provides a more natural interaction with the local teleconferencing site.

In some instances, selection of signals in this manner requires a human operator. This approach is distracting if carried out by a meeting participant, or costly, if carried out by a hired director. A few systems, however, attempt to perform the signal selection in an automated manner. T. Inoue, K. Okada, and Y. Matsushita, Learning from TV Programs: Application of TV Presentation to a Videoconferencing System and Proceedings of the ACM Symposium on User Interface Software and Technology, pp. 147–154, Pittsburgh, Pa. (Nov. 14–17, 1995) propose an automated system emulating the direction techniques used in the television industry.

U.S. Pat. No. 6,025,870 to Hardy describes a system for automatically capturing the changing focus of a video conference. The system "includes a video switch for selecting focus video information, a physical video input node coupled to provide physical video information to the video switch, a graphics processing module coupled to provide graphical video information to the video switch, and a remote source interface coupled to provide remote video information to the video switch. The videoconference system further includes an audio processing module for processing audio information. A record controller is coupled to the video switch, the graphics processing module and the audio processing module. The record controller is coupled to receive event information from the audio processing module and the graphics processing module. The record controller automatically determines a focus video source from the physical video input, the graphics processing module and the remote source interface responsive to receiving the event information. The record controller controls the video switch to couple the focus video source to a video switch output responsive to determining the focus video source."

While the systems disclosed by Inoue et al. and Hardy do provide improvement over more traditional systems, several deficiencies remain. In particular the Inoue system merely considers a relative probability of transitions from a current signal to a subsequent signal based on the classes of the current signal and available signals, where the signal classes are defined by the subject matter represented by the video signal. The system has, if any, a very limited sense of the current state and context of the video conference. The system is therefore unable to select meaningfully an appropriate signal based on the specific progression of events in a particular video conference, and instead transitions from one signal to another along standardized sequences.

The system disclosed by Hardy does incorporate an understanding of the current state of the conference, as indicated by the events received by the record controller. However, the ability of the system to respond to the changing state of the conference is limited to specific responses to specific events. Most notably, the system is unable to develop a continually refined assessment of the state and context of the conference. Instead, the system merely waits for a recognized event and then responds accordingly.

Moreover, neither system suggests that the selection of signals could be based on a history of the conference state, or a prediction of future conference states. Further, neither prior art system attempts to develop a quantitative estimate of the suitability of selection for each of the potentially selected signals. In these regards, the systems are more rule-based than model-based.

Finally, the prior art systems do not suggest a signal selection method that changes throughout the course of a conference to remain consistent with the changing dynamics of a typical business meeting.

What is needed is a system that continually monitors a teleconference to develop an understanding of the state and context of the conference. Based on this understanding, the system should consider and evaluate each candidate configuration of output signals, preferably quantitatively, and select from among the candidate output configurations a most desirable output configuration. In this manner, the system should develop a model of the conference, preferably incorporating a sense of continuity in the progression of selected output configurations. Further, the model is preferably varied throughout the course of the conference to allow for the changing dynamics of a typical business meeting.

Furthermore, the system, when operated at a local video conferencing site, should be compatible with any existing teleconferencing equipment present at the remote site.

Finally, the system should have interfaces that are simple and intuitive, allowing use by those with little or no computer literacy.

Importantly, the automated selection should be accomplished in a manner providing an accurate and engaging representation of the teleconference, thus allowing for more natural and meaningful interaction between physically separated teleconference participants.

SUMMARY

The invention provides appropriate output signals to output devices in a teleconference setting. Input signals are obtained from input devices, and information describing the teleconference is received from several sensors. On a substantially continuous basis, using the descriptive information, a desirability is computed for each of several possible output configurations, where each output configuration specifies a routing of output signals to output devices. The most desirable output configuration is then selected, and output signals are provided to output devices as specified by the selected output configuration.

Exemplary input devices include video cameras, computers, document scanners, and microphones. Exemplary sensors include microphones, motion detectors, and security badge readers. Output signals are composed from the input signals provided by the input devices. Examples of output signal composition include a selection of an input signal or composing a split-screen view from two or more input signals. The output signals are provided to output devices such as television monitors, computer displays, video recording devices, audio recording devices, and printers.

In the preferred embodiment of the invention, the desirability of each possible output configuration is calculated based on contributions from several components. Each component is multiplied by a component weighting and then additively combined with the other components to yield the desirability. These components can include, for example, an activity component, a saturation component, and a continuity component.

The activity component is based on contributions from several activity terms. Each activity term is multiplied by an activity term weighting and then additively combined with the other activity terms to yield the activity component of the desirability. Activity terms can, for example, include an audio activity term, a motion activity term, an audio undercoverage term, and an audio overcoverage term.

The audio activity term reflects the desirability of the possible output configurations based on audio activity detected by microphones within the teleconference site.

The motion term reflects the desirability of the possible output configurations based on motion detected by motion sensors within the teleconference site.

The audio undercoverage term indicates an increasing desirability for those output configurations incorporating output signals related to audio activity and yet not incorporated within the output configuration currently provided to the output devices.

Finally, the audio overcoverage term indicates a decreasing desirability for those output configurations incorporating output signals not related to audio activity and yet incorporated within the output configuration currently provided to the output devices.

The saturation component indicates an increasing desirability for output configurations incorporating output signals not currently provided to the output devices, and a decreasing desirability for output configurations incorporating output signals currently provided to at least one of said output devices.

The continuity component is based on contributions from several continuity terms. Each continuity term is multiplied by a continuity term weighting and then additively combined with the other continuity terms to yield the continuity component of the desirability. The continuity terms can include, for example, a spatial continuity term, a context continuity term, a rapid switching continuity term, and a sustained switching continuity term.

The spatial continuity term indicates a greater desirability for output configurations similar to the output configuration currently provided to the output devices.

The context continuity term indicates a greater desirability for output configurations recently provided to the output devices.

The rapid switching continuity term indicates a greater desirability for the output configuration currently provided to the output devices, and a lesser desirability for all other output configurations, the difference in desirability attaining a maximum value when the current output configuration is initially selected and decreasing thereafter.

Finally, the sustained switching continuity term indicates a greater desirability for the output configuration currently provided to the output devices, and a lesser desirability for all other output configurations, the difference in desirability proportional to a recent history switching rate between output configurations.

The component weightings, activity term weightings, and continuity term weightings are adjustable parameters than can be altered to affect the selection of a most desirable output configuration. Values for the adjustable parameters may be provided to suit a particular conference style, and may be varied over the duration of an individual conference.

The invention thus allows a large number of input signals obtained from a wide variety of input devices to be evaluated and routed to a wide variety of output devices using a consistent and logical framework. Diverse information describing the dynamics of the conferencing environment is incorporated in an intuitive manner to provide natural and meaningful interaction between physically separated teleconference participants.

DESCRIPTION

The invention operates in a teleconferencing setting, continuously receiving input signals from input devices and monitoring information from sensors which describe the teleconference to determine and provide a most desirable configuration of output signals to a set of output devices.

Figure 1:
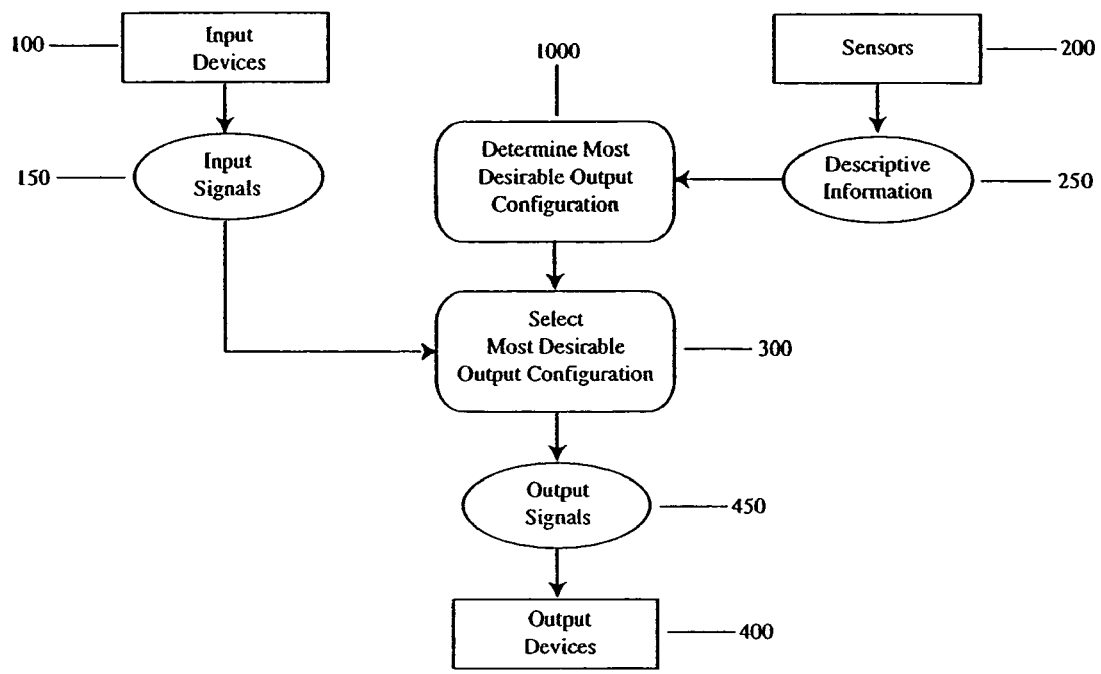
FIG. 1 is a flow chart that shows a method of selecting a most desirable configuration of output signals from among a plurality of possible output configurations according to the invention.

FIG. 1 is a flow chart that shows a method of selecting a most desirable configuration of output signals from among a plurality of possible output configurations according to the invention. One or more input devices 100 produce input signals 150. Substantially concurrently with the production of the input signals, one or more sensors 200 provide information 250 describing the teleconference site. Using the descriptive information, a central processor determines 1000 a most desirable output configuration among a plurality of possible output configurations, where each possible output configuration describes a particular routing of output signals to output devices. The most desirable output of configuration is then selected 300, and output signals 450 are routed to output devices 400 as specified by the selected output configuration.

An output signal may be one of the input signals, or a signal created by modification, combination, or both modification and combination of one or more input signals. Primarily, output signals derived from input signals that originate from input devices located at the local conferencing site are provided to output devices located at remote conferencing sites. However, in some embodiments, it may be desirable to provide such output signals to local output devices.

It should be noted that the steps shown in FIG. 1 occur on a substantially continuous basis. In particular, the steps are not executed in response to detected events or incidents transpiring within the conference site, as is the case in the prior art. Rather, the steps are executed repeatedly and continuously, allowing the system to maintain a continually updated assessment of the desirability of the possible output configurations based on the descriptive information acquired from the sensors.

Figure 2:
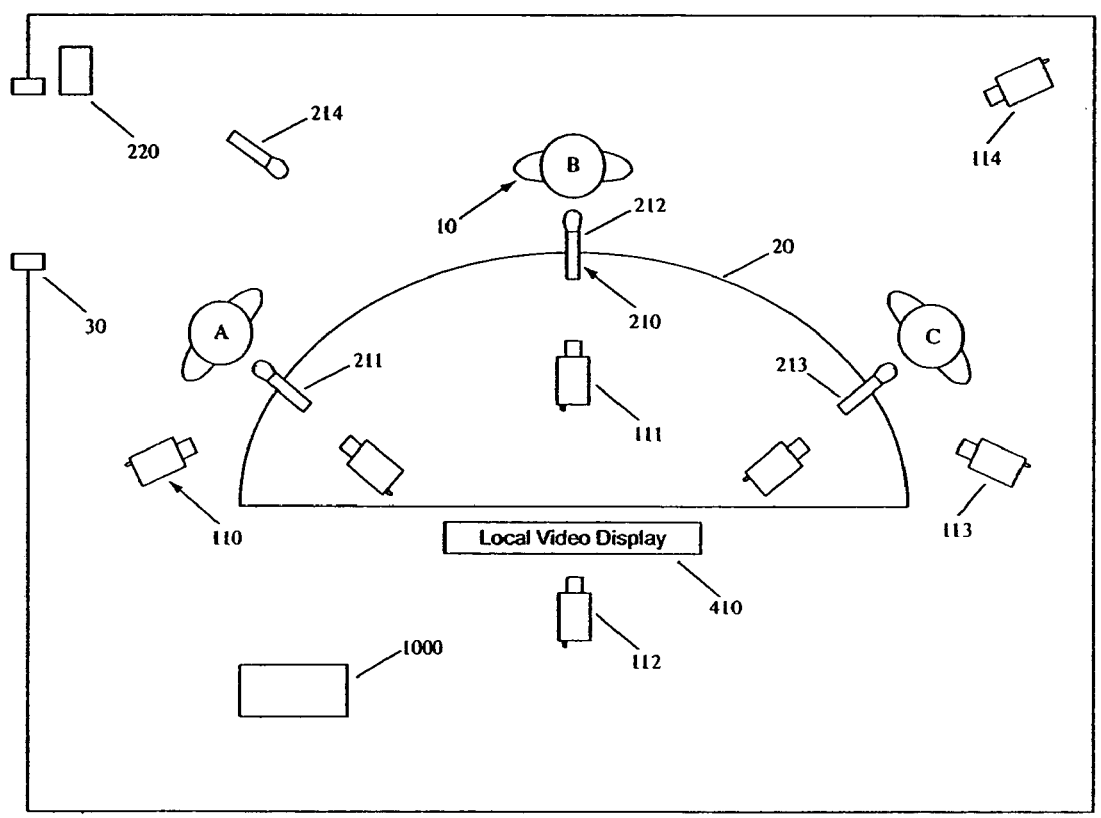
FIG. 2 is a schematic representation of a teleconference site according to the invention.

FIG. 2 is a schematic representation of a teleconference site according to the invention. As shown in FIG. 2, several local participants 10 are seated about a conference table 20, so as to be able to view a local video display 410. Several video cameras 110 are positioned throughout the conference facility to capture images of one or more of the local participants. Collectively, the video cameras capture images of one or more participants from a variety of angles and in a range of shot compositions. For example, the video cameras may capture a centered, close in view of a single participant 111, a wide view of all three participants 112, a view of two participants over the shoulder of a third 113, and a view of the entire conferencing site 114 including an entranceway 30. Referring to FIG. 1, the video cameras may be regarded as input devices 100 that produce input signals 150 in the form of video signals.

A plurality of microphones 210 are arrayed so as to capture the audio throughout the teleconference site. For example, microphones are positioned to capture the speech emanating from an individual conference participant 211 or to capture audio of a more ambient nature 214 not associated with an individual participant. In addition, a motion detector 220 is mounted so as to detect, for example, the entry or exit of a conference participant through the entranceway 30. Referring again to FIG. 1, the microphones and motion detector may be regarded as sensors 200 that acquire descriptive information 250 about the conferencing site. More specifically, the microphones 210 acquire audio signals that indicate where and when within the conferencing site there is audio activity, and the motion detector 220 indicates when a conference participant enters or exits the conference site.

Figure 3:
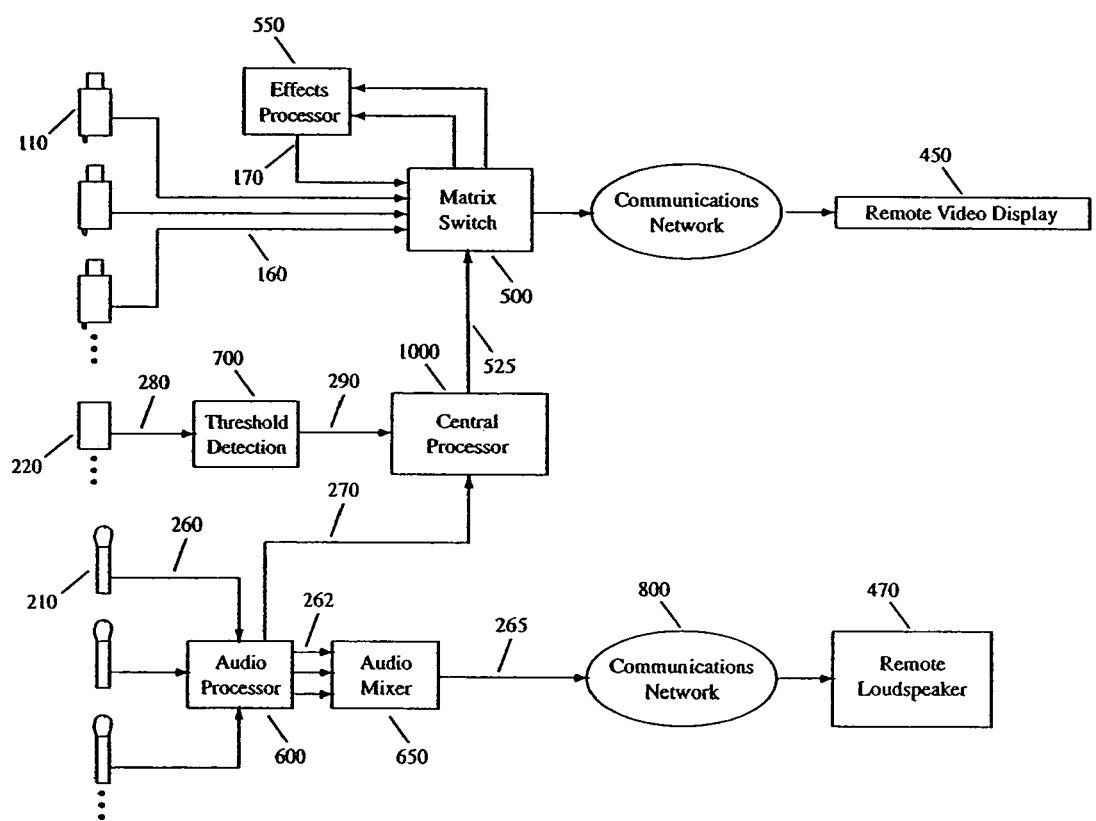
FIG. 3 is a schematic representation of a teleconference system according to the invention.

FIG. 3 is a schematic representation of a teleconference system according to the invention. The audio signals 260 obtained by the microphones 210 are provided to an audio processor 600. The audio processor analyzes each audio signal to determine whether or not there is audio activity in the vicinity of each microphone. To make this determination, the processor may use any of low-pass filtering, rising or falling edge detection, and energy or amplitude thresholding, preferably hysteretic in nature. The audio processor may also perform signal conditioning such as echo canceling. An example a device providing this functionality is the Vortex EF2280, manufactured by Polycom, Inc. of Pleasanton, Calif.

A true or false value for each of the microphones, reflecting the presence or absence of audio activity, is provided by the audio processor to a central processor 1000. In FIG. 3, this is accomplished by passing an audio activity vector 270 to the central processor with elements valued either 0 or 1, and length equal to the number of microphones. Alternatively, the audio processor may pass a vector of scalar values, with the magnitude of each element representing the relative intensity of the audio activity in the vicinity of the corresponding microphone.

The audio processor also provides the conditioned audio signals 262 to an audio mixer 650. The audio mixer combines the signals into a combined audio signal 265 that is passed through a communications network 800 to a remote loudspeaker 470 at the remote conferencing site. The participants at the remote conferencing site thus hear the combined audio captured by the microphones 210 at the local conferencing site. An example of an audio mixer suitable for use in the invention is the Polycom Vortex EF2280.

The motion detection signal 280 obtained by the motion detector 220 is provided to a threshold detection unit 700. Preferably employing a low-pass filter and hysteretic thresholding, the threshold detection unit assigns a true or false value to the motion detection signal, reflecting the presence or absence of motion in the vicinity of the detector, and provides this value to the central processor 1000. In FIG. 3, this is accomplished by passing to the central processor a motion activity vector 290 with a single element valued either 0 or 1. In embodiments of the invention employing more than one motion detector, the length of the motion activity vector is increased accordingly.

The video signals 160 acquired by the video cameras 110 are provided to a matrix switch 500. The matrix switch is also coupled with several output devices. In FIG. 3, the matrix switch is coupled with an effects processor 550, and a remote video display 450, via a communications network 800. The remote video display is located at the remote conferencing site and is analogous to the local video display shown in FIG. 2. The effects-processed video signal 170 produced by the effects processor is also provided as an input to the matrix switch. The matrix switch selects as output signals one or more of the input signals it receives and routes them to any one or more of the output devices to which it is coupled. An example of a matrix switch suitable for use in the invention is the Matrix 3200 Video Switch, manufactured by Extron Electronics of Anaheim, Calif.

Based on the descriptive information of the local conference site received in the form of the audio activity vector 270 and the motion activity vector 290, the central processor 1000 provides a switching configuration instruction 525 to the matrix switch which specifies a selection and routing of output signals, and which defines an output configuration.

A great number of output embodiments of the invention are possible. In one output configuration, a head-on view of a single participant may be routed to the remote video display. Alternatively, a wide-angle view of all participants may be routed to the remote video display.

Other output configurations provide, for example, effects-processed output video signals to the remote video display, such as video with text overlays, and split-screen shots composed from two separate video input signals. The unprocessed input video signal or input video signals are provided to the effects processor by the matrix switch. The effects-processed video signal is then returned to the matrix switch and routed to the remote video display.

To produce the desired effect, it may be necessary for the matrix switch to provide more than one video input signal to the effects processor, as shown in FIG. 3. Effects processors suitable for use in the invention, including the Prodigy, manufactured by Videotek, Inc. of Patstown, Pa., capable of producing split-screen view from two video input signals, and the CODI character generator, manufactured by Chyron Graphics of Melville, N.Y., are well known in the art.

The teleconference setup shown in FIG. 2 and the accompanying schematic shown in FIG. 3 are simple in nature. Significantly more complex and full-featured embodiments are within the scope of the invention, which may find application in forms of conferencing other than traditional teleconferencing.

For example, the output signals derived from input signals obtained from input devices located at the local conferencing site are generally provided to output devices at the remote conferencing site. However, alternative embodiments of the invention employ a secondary local video display, where it may be desirable to display for the local participants the video signal routed to the remote video display. In this embodiment, a local video input signal is routed to a local output device.

Further, the audio signals obtained by the microphones serve only as descriptive information, and are not treated as input signals to be considered as output signals in possible output configurations. Rather, the microphone signals are continually mixed together by the audio mixer 650 and provided to the remote location through the communications network 800. In other embodiments of the invention, the microphone signals are provided to the matrix switch in a manner analogous to the video signals of FIG. 3, and are treated as input signals.

Effects processing may also be applied to the audio signals. In these embodiments, the central processor 1000 controls which of the several audio input signals are selected and provided to output devices through its selection of a most desirable output configuration. In such embodiments of the invention, the microphones serve as both input devices and sensors, and the audio signals serve as both input signals and descriptive information.

In other embodiments of the invention, the video signals additionally serve as descriptive information. A video processing unit such as a gesture recognition unit or a gaze detection unit extracts descriptive information from the video signals that is passed to the central processor.

Other embodiments incorporate input devices, sensors, and output devices not present in the preferred embodiment. Among such input devices are, for example, radio tuners, audio tapes, CD's, television antennae, VCR's, DVD's, DVR's, CD-ROM's, document cameras, document scanners, facsimile machines, and personal computers. Speakers, amplifiers, signal processors, tape recorders, digital audio recorders, computer monitors, projectors, facsimile machines, VCR's, and DVR's are suitable for use as output devices. Using recording devices such as VCR's and DVR's for input and output devices allows for archival and retrieval of teleconferences on a more durable storage medium. A wide variety of descriptive information may be gathered by sensors such as video processing units, audio processing units, seat sensors, personnel ID readers, security badge readers, range finders, and environmental sensors such as hygrometers and thermometers. Such sensors may indicate, for example, temperature, humidity, illumination level, the opening of a door, the presence of an individual in an entryway to the teleconference site, the presence of a teleconference participant within the teleconference site, the seating of a participant, the standing up of a participant, the speaking activity of a participant, the speaking of a predetermined word by a participant, the posture of a participant, the gaze direction of a participant, the facial expression of a participant, and a gesture by a participant.

Importantly, the invention allows for any number of input devices and output devices to be handled, with a corresponding increase in the number of possible output configurations. The flexibility in the selection of input and output devices ensures that the invention is compatible with existing teleconferencing systems. Notably, an output configuration selected and provide by the central processor and matrix switch can be displayed on a standard remote video display.

The invention may also be extended to include embodiments where descriptive information is gathered for one or more remote teleconference sites as well as the local teleconference site, and the central processor determines an output configuration based on a more global description of all teleconference sites in aggregate. Similarly, the input signals considered as available output signals for use in the possible output configurations need not originate at the local conferencing site.

For example, in one embodiment, a central processing algorithm considers all input signals from all sites in producing output signals, allowing for a truly diverse range of possible output configurations. For example, split-screen views composed from video signals originating at separate conferencing sites are possible. In such embodiments, the input signals and descriptive information may be transmitted to the central processor through a communications network on a continual basis, or alternatively, the descriptive information may be transmitted continually and the input signals transmitted only when the central processor determines that a specific input signal is needed to create an output signal in the selected output configuration.

The invention may also find application in fields other than teleconferencing. For example, the invention may aid in the production of live broadcast television, the editing of movies, the editing of television programs, the creation of a master security video signal from several video cameras, the selection of personalized television programming with a cable television set-top tuning device, and the creation of night club video and music programs.

Figure 4:
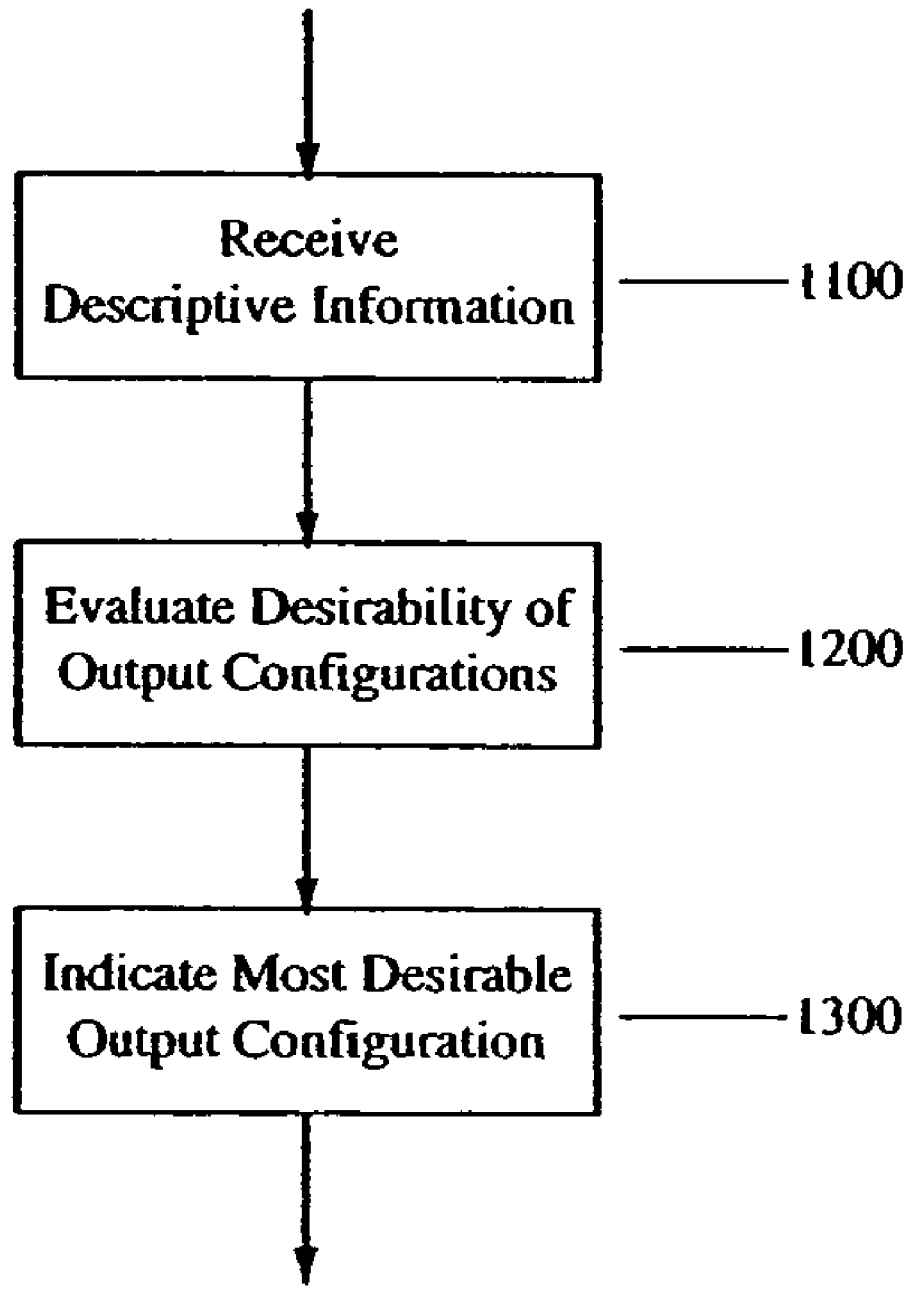
FIG. 4 is a flow chart that shows a method of determining a most desirable output configuration according to the invention.

FIG. 4 is a flow chart that shows a method of determining a most desirable output configuration according to the invention. The method shown in FIG. 4 is executed by the central processor 1000. The method begins with the central processor receiving descriptive information 1100 from the one or more sensors. The central processor then evaluates a desirability for each of the possible output configurations 1200. The desirabilities determined are then used to indicate a most desirable output configuration 1300. The indicated most desirable output configuration is then selected 300 as shown in FIG. 1, with a device such as the matrix switch 550 of FIG. 2.

The method of FIG. 4 is preferably executed on a substantially continuous basis throughout a teleconference. In practice, it is convenient to begin execution of the method at the beginning of each in a series of regular time intervals, while the length of the interval provides the processor sufficient time to execute the method. A most desirable output configuration is determined, selected, and implemented once per interval. Further, the duration of the interval may be made short enough that the evaluation and selection of a most desirable output configuration appears to conference participants as a continuous process.

In the preferred embodiment of the invention, the desirability of each possible output configuration is evaluated numerically, and the most desirable output configuration is the output configuration with the greatest numerical desirability.

Figure 5:
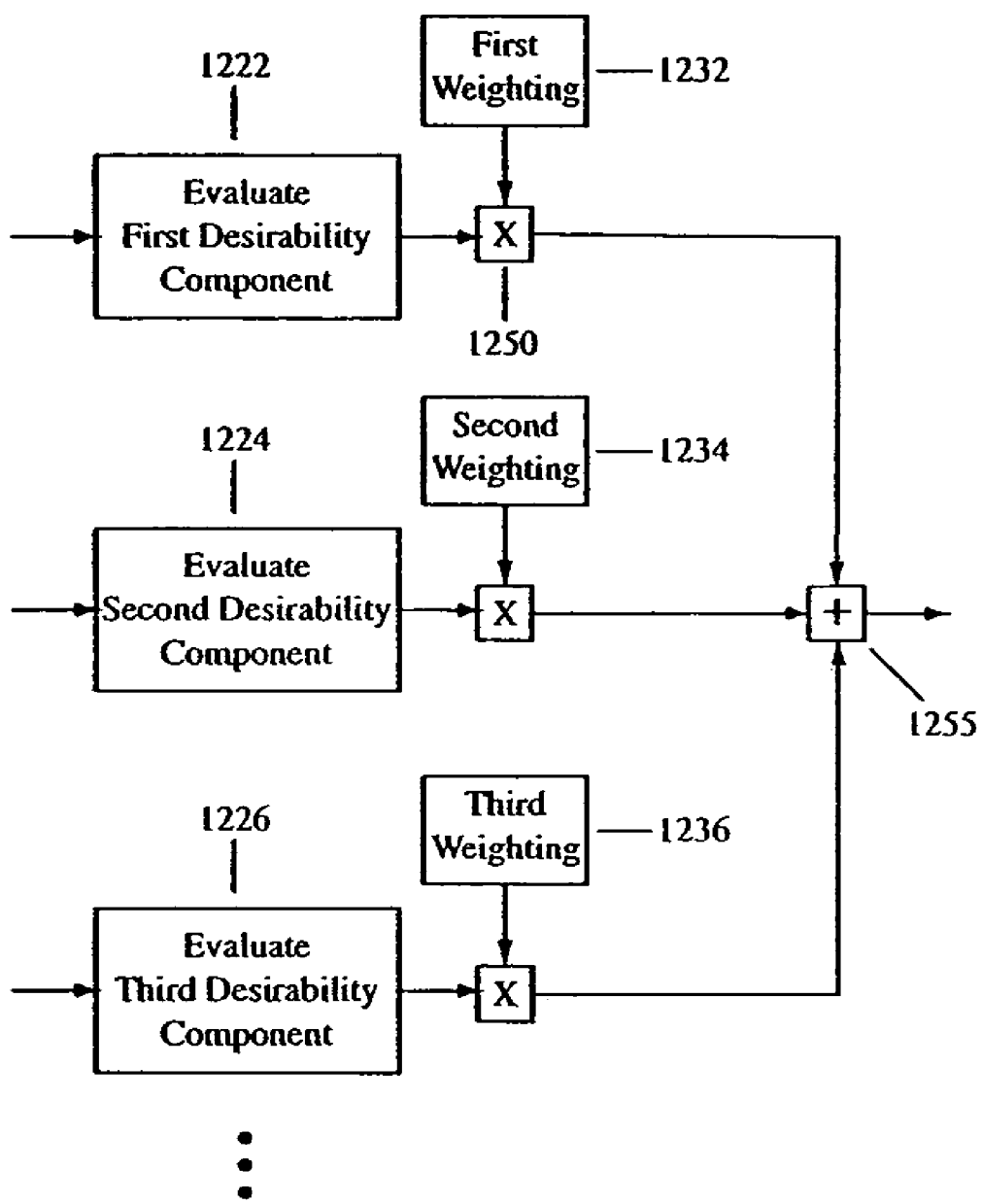
FIG. 5 is a flow chart that shows a method of numerically evaluating a desirability for each of a plurality of possible output configurations according to the invention.

FIG. 5 is a flow chart that shows a method of numerically evaluating a desirability for each of a plurality of possible output configurations according to the invention. The method begins with the evaluation of first 1222, second 1224, and third 1226 desirability components for the output configuration. Evaluation of the components may be performed substantially concurrently or in series. The first, second, and third desirability components are then multiplied 1250 by first 1232, second 1234, and third 1236 weightings, respectively, that reflect the relative importance of the components in determining the overall desirability of the output configuration. The results of the multiplication operations are then added 1255 together to obtain the desirability of the output configuration. Note that while the desirability evaluated in the preferred embodiment comprises three component desirabilities, other embodiments may evaluate desirabilities with any number of components.

In the preferred embodiment of the invention, the components detailed in FIG. 5 are termed activity, saturation, and continuity. As shown in FIG. 3, evaluating the desirability of the possible output configurations reduces to evaluating the desirability of displaying each of the available video output signals on the remote video display.

Mathematically, the desirabilities of the available output signals may be tabulated in a column vector D that is evaluated as $$D(t) = K^A A(t) + K^S S(t) K^C C(t) \quad (1)$$

where $A(t)$ is the attention component, $C(t)$ is the continuity component, and $S(t)$ is the saturation component. Each component varies as a function of time, leading to a time dependent desirability, $D_i(t)$, for each available video output signal. Associated with each component is a weighting, $K^A$ for the activity component, $K^C$ for the continuity component, and $K^S$ for the saturation component. As noted, the relative value of these weightings reflect the relative importance of the three components in determining the desirability.

Activity Component

The activity component reflects the desirability of an available video output signal based on the current activity within the teleconference site indicated by the descriptive information. The attention component is calculated by additively combining four terms, i.e. audio activity, motion activity, audio undercoverage, and audio overcoverage. Associated with each of these terms is a multiplicative weighting reflecting the relative importance of each term in determining the attention component of the desirability. Mathematically, $$A(t) = k_a A^a(t) + k_m A^m(t) + k_u A^u(t) + k_O A^O(t) \quad (2)$$

Audio Activity Term

The audio activity term reflects the desirability of an available video output signal based on the detection of audio activity within the teleconference site. This notion is numerically quantified by mapping the audio activity vector received by the central processor from the sensors onto the available video output signals. The mapping is accomplished with an audibility matrix, the elements of which reflect the relevance of a particular microphone to a particular video output signal. For example, consider a subset of the available video output signals in the preferred embodiment of FIGS. 2 and 3, where the column vector D of desirabilities contains desirabilities for the video output signals $$\begin{bmatrix} A \\ B \\ \text{Split } A-B \\ \text{Group} \end{bmatrix} \quad (3)$$

where A refers to a video output signal displaying a close in view of participant A, B a close in view of participant B, Split A-B a split-screen view of participants A and B, and Group a wide-angle view of all participants. An audio activity vector a(t) with successive elements reflecting the audio activity captured by microphones 211, 212, 213, and 214, respectively, is mapped onto the subset of available video output signals by evaluating $$A^a(t) = Ua(t) \quad (4)$$

where a(t) is the audio activity vector and U is the audibility matrix. For the conference site geometry of FIG. 2, the audibility matrix U may be given by $$U = \begin{bmatrix} 1 & 0 & 0 & 0 \\ 0 & 1 & 0 & 0 \\ 0.75 & 0.75 & 0 & 0 \\ 0.6 & 0.6 & 0.6 & 1 \end{bmatrix} \quad (5)$$

Thus, if only microphone 211 is active, the close in view of participant A is the most desirable video output signal, with regard to audio activity. If microphones 211 and 212 are both active, the split-screen view of participants A and B is the most desirable. If only microphone 214 is active, or if microphones 211, 212, and 213 are active, the group view of all participants is the most desirable.

Motion Activity

The motion activity term reflects the desirability of each available shot video output signal based on the motion detected in the teleconference site. As with the audio activity term, this is quantified by mapping the motion activity vector onto the available video output signals. Considering the single motion sensor 220 of FIG. 2 and the subset of available video output signals given above, the motion activity desirability may be computed as $$A^m(t) = Mm(t) \quad (6)$$

where m(t) is the motion activity vector, here a single element, and M is a motion visibility matrix, reflecting the visibility of the sensible region of the motion detector within the field of view of each output video signal. The motion visibility matrix is given by $$M = \begin{bmatrix} 0.5 \\ 0 \\ 0 \\ 1 \end{bmatrix} \quad (7)$$

Thus, if the motion detector senses motion, the group view is the most desirable output signal, because it effectively shows the entranceway monitored by the motion detector. A close in view of participant A is somewhat less desirable, because the entranceway is visible in the background of the view, while the other two video output signals are not at all desirable because the entranceway is not at all visible.

Audio Undercoverage

While the audio activity and motion activity terms reflect the desirability of each available video output signal based on the current activity in the conference site, the audio undercoverage term reflects the desirability of a each available video output signal based on the history of previously selected video output signals compared with the history of the audio activity. Specifically, the audio undercoverage term increases the desirability of those video output signals that display areas within the conference site containing audio activity but are nonetheless not selected.

Mathematically, the audio undercoverage term $A^u(t)$ at a given time t is based upon the the audio undercoverage at a previous time $t-\Delta t$, with $$A^u(t) = \epsilon_u A^u(t-\Delta t) + H_0(t) Ua(t) \Delta t \quad (8)$$

where the operator denotes element by element multiplication of two vectors, and $\epsilon_u$ is a decay factor. $H_0(t)$ is a column vector with length equal to the number of available output video signals, the $i^{th}$ element of which is valued 1 if the $i^{th}$ available output video signal is not selected, and 0 if the the $i^{th}$ available output video signal is selected. Thus, if a particular video output signal displays a region of audio activity, yet is continually ignored in the selection process, it accumulates a high audio undercoverage value. The decay constant ensures that periods of undercoverage occurring long ago are given less consideration than those occurring more recently.

Audio Overcoverage

Complementary to audio undercoverage, audio overcoverage decreases the desirability of an available video output signal that is selected even though it does not display a region within the teleconference site containing current audio activity. Specifically, $$-A^o(t) = \epsilon_o A^o(t-\Delta t) + H_1(t)(1-Ua(t))\Delta t \quad (9)$$

where I is a column vector of ones, and $H_1(t)$ is a column vector with length equal to the number of available output video signals, the $i^{th}$ element of which is valued 0 if the $i^{th}$ available output video signal is not selected, and 1 if the the $i^{th}$ available output video signal is selected. As with audio undercoverage, $\epsilon_o$ is a decay factor. The negative sign reflects the fact that an increase in audio overcoverage decreases the desirability of an available video output signal.

Note that the notions of undercoverage and overcoverage are easily extended to any other type of activity, for example motion activity, to create motion undercoverage and motion overcoverage terms.

Saturation Component

The saturation component reflects the boredom that may result if one particular available video output signal is selected disproportionately more often than others. The saturation component decreases the desirability of a particular video output signal when the signal is currently selected, and increases the desirability when the signal is not selected. Mathematically, $$-S(t) = \epsilon_s S(t-\Delta t) + H_1(t)\Delta t \quad (10)$$

where $\epsilon_s$ is a decay factor. The saturation component has a smoothing effect on the selection of video output signals and, apart from other components, ensures that all video output signals are selected at least part of the time. The negative sign reflects the fact that an increase in saturation decreases the desirability of a particular video output signal.

Continuity Component

The continuity component reflects the impact the selection of a particular video output signal would have on the continuity of the progression of video output signal selections. Qualitatively, the selection of a particular video output signal may appear smooth and seamless, exhibiting a high level of continuity, or abrupt and confusing, exhibiting a low level of continuity. The continuity component is calculated based on contributions from four continuity terms; i.e. spatial continuity, contextual continuity, rapid switching continuity, and sustained switching continuity. Associated with each of these terms is a multiplicative weighting that reflects the relative importance of each term in determining the continuity component of the desirability. Mathematically, $$C(t) = k_s C^s(t) + k_c C^c(t) + k_r C^r(t) + k_b C^b(t) \quad (11)$$

Spatial Continuity

The spatial continuity term decreases the desirability of those video output signals that, if selected, would demand a great shift in the mental focus of a remote participant viewing the progression of selected signals. The decrease in desirability for a particular video output signal is thus dependent on the currently selected signal. These penalties may be summarized in a spatial continuity matrix. In the spatial continuity matrix, the penalty associated with a transition from the $j^{th}$ video output signal to the $i^{th}$ video output signal is given by the matrix element $s_{ij}$. For example, for the subset of available video output signals given earlier, the spatial continuity matrix may be given by $$S = \begin{bmatrix} 0 & 1 & 0.5 & 0.75 \\ 1 & 0 & 0.5 & 0.75 \\ 0.5 & 0.5 & 0 & 1 \\ 0.75 & 0.75 & 1 & 0 \end{bmatrix} \quad (12)$$

The spatial continuity is then evaluated as $$-C^s(t) = SH_1(t) \quad (13)$$

where the negative sign reflects the fact that a greater shift in spatial continuity decreases the desirability of an available video output signal. The spatial continuity matrix indicates that the penalty associated with a transition from a head-on view of participant A to a head-on view of participant B is 1, indicating a rather abrupt shift, while the transition to a split-screen view of participants A and B is assigned a penalty of only 0.5. By definition, all diagonal elements $s_{ii}$ are zero-valued. In many cases, the matrix is also symmetric, with $s_{ij}=s_{ji}$. However, configurations may arise in which the change in continuity associated with a transition from one video output signal to another is not equal to that associated with the reciprocal transition.

Contextual Continuity

The contextual continuity term reflects how distant a particular video output signal is in the memory of a remote participant viewing the progression of selected signals. Qualitatively, the currently selected video output signal is perfectly in context, while a video output signal not selected recently is out of context because it requires the observing participant to search his memory to place the signal in context if it is displayed.

The contextual continuity of the $i^{th}$ video output signal is given by $$C_i^c(t) = \begin{cases} 1 & \text{if the } ith \text{ video output signal is currently selected} \\ \varepsilon_c C_i^c(t - \Delta t) & \text{otherwise} \end{cases} \quad (14)$$

where $\varepsilon_c$ is again a decay factor. Thus, when a video output signal is newly selected, it is very fresh in an observer's memory and is assigned a high desirability. The desirability is decreased for those video output signals not currently selected until they are selected again.

Rapid Switching Continuity

The rapid switching continuity term reflects the discomfort experienced by conference participants viewing the progression of selected video output signals when two different video output signals are selected in rapid succession. When a video output signal is newly selected, all other video output signals are penalized. While the newly selected video output signal remains the currently selected video output signal, the penalty is decreased over time.

Specifically, upon selection of a new video output signal $$C_i^r(t) = \begin{cases} 0 & \text{if the } ith \text{ video output signal is the newly selected signal} \\ -1 & \text{otherwise} \end{cases} \quad (15)$$

While the newly selected video output signal remains the currently selected video output signal, $$C_i^r(t) = \begin{cases} 1 & \text{if the } ith \text{ video output signal is currently selected} \\ \varepsilon_r C_i^r(t - \Delta t) & \text{otherwise} \end{cases} \quad (16)$$

The decay factor $\varepsilon_r$ is chosen to reflect the time scale over which the discomfort associated with a newly selected video output signal diminishes.

Sustained Switching Continuity

The sustained switching continuity term decreases the desirability of video output signals that, if selected and provided to the output devices, would yield to a frenetic progression of selected signals. It penalizes the selection of any video output signal other than the currently selected video output signal. The magnitude of the penalty is proportional to a recent switching rate reflecting the frequency with which newly selected shots have been selected over a recent time period. The sustained switching continuity term imparts a sense of inertia, or damping, to the progression of selected video output signals. Mathematically, $$C_i^b(t) = \begin{cases} 0 & \text{if the } ith \text{ video output signal is currently selected} \\ -\beta(t, \tau) & \text{otherwise} \end{cases} \quad (17)$$

Here, $\beta(t,\tau)$ is a parameter that reflects the recent history switching rate, i.e. the average number of switches per unit time over the recent time period $\tau$.

Participant Priorities

In the preferred embodiment of the invention, the desirability is further modified by considering the relative importance of the local conference participants. Each participant is assigned a priority, which is then mapped onto the available video output signals with a participant visibility matrix. Specifically, a priority weighted desirability, D'(t), may be evaluated as $$D'(t)=D(t)Vp \quad (18)$$

where p is a column vector containing the participant priorities, and V is the participant visibility matrix. Element $v_{ij}$ of matrix V indicates the visibility of the $j^{th}$ participant in the $i^{th}$ video output signal. The effect of the participant priorities is thus easily nullified by assigning all participants and equal priority.

The behavior of the central processor as it executes the preceding method of evaluating the desirability of each possible output configuration is controlled in large part by the values of the weightings, matrix elements, decay factors, and participant priorities. In the preferred embodiment of the invention, some or all of these values are user adjustable parameters that may be varied by the one or more of the conference participants. The participants may then adjust the behavior of the selection process to suit the needs of a particular conference. The values are preferably presented on a touch screen flat panel interface allowing for intuitive access to and control of the user adjustable parameters. Alternatively, various present configurations may be provided from which users may select a most appropriate selection process behavior.

A useful simplification is achieved by restricting the user adjustable parameters to the component weightings, term weightings, and participant priorities. These values are varied to suit the changing dynamics of a particular conference. The matrix elements, and decay constants, however, are more reflective of a particular teleconference site geometry, and may thus remain fixed throughout an individual conference.

The central processor also preferably supports the loading of program modules that provide a set of values designed to match a specific conference style. For example, specialized modules may be created for board meetings, staff meetings, and design team meetings. Further, the values need not remain constant through a conference, but instead may change to reflect the differing dynamics of the beginning, middle, and end of a meeting.

As noted, the invention may incorporate any of a number of input and output devices to achieve a wide range of functionality. In an alternative embodiment of the invention, facsimile machines at the local and remote conference sites serve as input devices, sensors, and output devices. The scanned image of a document inserted into the local facsimile machine is treated as an input signal. A sensor on the facsimile machine indicates to the central processor that there is facsimile activity at the local conference site. Local facsimile activity in turn induces a large increase in the desirability associated with routing the facsimile input signal as an output signal to the remote facsimile machine.

In another embodiment, a security badge reader is included as a sensor. The central processor computes a current security level for the conference, defined by the lowest security level among the conference participants currently at the conference site. If a new participant with a security level below the current security level enters the conference site, the security level of the conference is lowered. The lowering of the conference security level induces a dramatic, essentially infinite lowering of the desirability of routing any output signals containing sensitive material to output devices viewable by the participant with a lower security level.

Although the invention is described herein with reference to several embodiments, including the preferred embodiment, one skilled in the art will readily appreciate that other applications may be substituted for those set forth herein without departing from the spirit and scope of the invention.

Accordingly, the invention should only be limited by the following claims.

The invention claimed is:

1. A method for conferencing, comprising the steps of:
receiving at least one input signal from at least one input device;
receiving descriptive information during a conference from at least one sensor;
determining, in a substantially continuous manner, based on said descriptive information, a desirability for each of a plurality of possible output configurations, each of said possible output configurations specifying a routing of at least one output signal to at least one output device, wherein said desirability is evaluated numerically, and wherein said desirability comprises:
selecting a most desirable output configuration among said plurality of possible output configurations; and
providing said at least one output signal to said at least one output device in accordance with said most desirable output configuration, wherein said desirability comprises:
a plurality of components;
wherein each of said components is multiplied by a component weighting and then additively combined with all other of said components to yield said desirability, and
wherein said component weighting indicates a relative importance of said each of said components in determining said desirability.

2. The method of claim 1, wherein at least one input signal is received via a telecommunications network.

3. The method of claim 1, further comprising a plurality of input devices located at a plurality of physically disparate locations.

4. The method of claim 1, wherein at least one output signal is provided via a communications network.

5. The method of claim 1, further comprising a plurality of output devices located at a plurality of physically disparate locations.

6. The method of claim 1, wherein at least one input device is an audio device.

7. The method of claim 6, wherein said audio device is any of:
an analog audio source; and
a digital audio source.

8. The method of claim 1, wherein at least one input device is a video device.

9. The method of claim 8, wherein said video device is any of:
a video camera;
a television signal source;
a video effects processor;
an analog video source; and
a digital video source.

10. The method of claim 1, wherein at least one input device is a multimedia device.

11. The method of claim 10, wherein said multimedia device is any of:
a document camera;
a document scanner;
a facsimile machine; and
a personal computer.

12. The method of claim 1, wherein at least one output device is an audio device.

13. The method of claim 12, wherein said audio device is any of:
a speaker;
an amplifier;
a signal processor;
an analog audio recording device; and
a digital audio recording device.

14. The method of claim 1, wherein at least one output device is a video device.

15. The method of claim 14, wherein said video device is any of:
a television;
a monitor;
a computer display;
a video effects processor;
an analog video recording device; and
a digital video recording device.

16. The method of claim 1, wherein at least one output device is a multimedia device.

17. The method of claim 16, wherein said multimedia device is any of:
a printer;
an overhead projector;
a document projection system;
a facsimile machine, and
a personal computer.

18. The method of claim 1, wherein at least one input device reproduces from a storage medium a previously acquired input signal.

19. The method of claim 1, wherein at least one output device stores said output signal on a storage medium.

20. The method of claim 1, wherein said step of providing said at least one output signal comprises the step of composing at least one output signal from at least one input signal.

21. The method of claim 20, wherein said step of composing comprises the step of creating a video signal that represents a split-screen view of at least two video signal inputs.

22. The method of claim 20, wherein said step of composing comprises the step of associating at least one audio input signal with a video input signal.

23. The method of claim 20, wherein said step of composing comprises the step of selecting at least one input signal.

24. The method of claim 1, wherein said descriptive information received from said at least one sensor comprises information indicating any of:
- temperature;
- humidity;
- illumination level;
- an opening of a door;
- a presence of a conference participant in an entryway;
- a presence of a conference participant within a conference site;
- a change in a security level of said conference, said security level defined by a lowest security level among all conference participants;
- a seating of a conference participant;
- a standing up of a conference participant;
- a completed scanning of a document by a facsimile machine;
- an activity of a microphone input;
- a speaking activity of a conference participant;
- a speaking of a predetermined word by a conference participant;
- a posture of a conference participant;
- a gaze direction of a conference participant;
- a facial expression of a conference participant; and
- a gesture by a conference participant.

25. The method of claim 1, wherein at least one sensor also functions as one of said at least one input device.

26. The method of claim 1, wherein at least one input device also functions as one of said at least one sensor.

27. The method of claim 1, wherein said most desirable output configuration has a greatest numerical desirability among said possible output configurations.

28. The method of claim 1, wherein said component weighting is an adjustable parameter.

29. The method of claim 28, wherein said adjustable parameter is assigned a value that produces a selection of output configurations that is consistent with a desired conference style.

30. The method of claim 1, wherein said desirability comprises an activity component comprising at least one activity term indicating a relevance of said descriptive information to each of said possible output configurations.

31. The method of claim 30, wherein each of said at least one activity term is multiplied by an activity term weighting and then additively combined with all other of said at least one activity term to yield said activity component, and
wherein said activity term weighting indicates a relative importance of said each of said at least one activity term in determining said activity component.

32. The method of claim 31, wherein said activity term weighting is an adjustable parameter.

33. The method of claim 32, wherein said adjustable parameter is assigned a value that produces a selection of output configurations that is consistent with a desired conference style.

34. The method of claim 30, wherein each of said at least one activity term comprises:
a mapping of said descriptive information onto said possible output configurations.

35. The method of claim 34, wherein said descriptive information comprises:
an activity vector;
wherein said mapping comprises a matrix that contains elements which are arranged in at least one row and at least one column, wherein each of said at least one row corresponds to one of said possible output configurations and each of said at least one column corresponds to an element of said activity vector; and
wherein said mapping is performed by multiplying said matrix by said activity vector.

36. The method of claim 35, wherein said elements of said matrix are adjustable parameters.

37. The method of claim 34,
wherein said at least one input device comprises at least one video camera having a visible range;
wherein said at least one sensor comprises at least one microphone having an audible range;
wherein said at least one input signal comprises at least one video signal that is received from said at least one video camera;
wherein said descriptive information comprises at least one microphone activity level that identifies an activity level of said at least one microphone;
wherein said possible output configurations provide at least one video signal to at least one output device; and
wherein said mapping comprises an audibility mapping that indicates an extent to which said audible range of each of said at least one microphone corresponds to said visible range of each of said at least one video camera.

38. The method of claim 37, wherein said at least one activity term comprises:
an audio activity term that indicates a greater desirability for output configurations that incorporate output signals composed at least in part from video signals that correspond, as indicated by said audibility mapping, to active microphones.

39. The method of claim 37, wherein said descriptive information further indicates which of said at least one output signal are currently provided to which of said at least one output device;
wherein said at least one activity term comprises an audio undercoverage term that indicates an increasing desirability for output configurations that incorporate output signals that are composed at least in part from a video signal that corresponds, as indicated by said audibility mapping, to active microphones, and that are not currently provided to at least one output device.

40. The method of claim 37, wherein said descriptive information further indicates which of said at least one output signal are currently provided to which of said at least one output device; and
wherein said at least one activity term comprises an audio overcoverage term which indicates a decreasing desirability for output configurations that incorporate output signals that are composed at least in part from a video signal that corresponds, as indicated by said audibility mapping, to inactive microphones, and that are currently provided to at least one output device.

41. The method of claim 1, wherein said descriptive information further indicates which of said at least one output signal are currently provided to which of said at least one output device; and wherein said desirability comprises a saturation component that indicates an increasing desirability for output configurations that incorporate output signals that are not currently provided to at least one output device, and that indicate a decreasing desirability for output configurations that incorporate output signals currently provided to at least one output device.

42. The method of claim 41,
wherein said at least one input device comprises at least one video camera;
wherein said at least one input signal comprises at least one video signal received from said at least one video camera;
wherein said possible output configurations comprise providing at least one video signal to at least one output device;
wherein said saturation component increases for output configurations that incorporate at least one video signal currently provided to at least one output device; and
said saturation component decreases for output configurations that do not incorporate at least one video signal currently provided to at least one output device.

43. The method of claim 1, wherein said desirability comprises:
a continuity component comprising at least one continuity term.

44. The method of claim 43, wherein each of said at least one continuity term is multiplied by a continuity term weighting and then is additively combined with all other of said at least one continuity term to yield said continuity component; and
wherein said continuity term weighting indicates a relative importance of said each of said at least one continuity term in determining said continuity component.

45. The method of claim 44, wherein said continuity term weighting is an adjustable parameter.

46. The method of claim 45, wherein said adjustable parameter is assigned a value for producing a selection of output configurations that is consistent with a desired conference style.

47. The method of claim 43, wherein said descriptive information comprises:
a history of recently provided output configurations; and
wherein said at least one continuity term comprises a context continuity term that indicates a greater desirability for said recently provided output configurations.

48. The method of claim 43, said descriptive information comprises:
an indication of a current output configuration that is currently provided to said output devices.

49. The method of claim 48, wherein said at least one continuity term comprises:
a rapid switching continuity term that indicates a greater desirability for said current output configuration and a lesser desirability for all other of said possible output configurations; and
wherein said greater desirability exceeds said lesser desirability by an amount that attains a maximum value immediately upon selection of said current output configuration and that decays thereafter.

50. The method of claim 48, wherein said descriptive information further comprises:
a recent history switching rate that reflects a time averaged rate at which output configurations that differ from said current output configuration are selected;
wherein said at least one continuity term comprises a sustained switching continuity term that indicates a greater desirability for said current output configuration and a lesser desirability for all other of said possible output configurations; and
wherein said greater desirability exceeds said lesser desirability by an amount that is proportional to said recent history switching rate.

51. The method of claim 48, wherein said at least one continuity term comprises:
a spatial continuity term that indicates a greater desirability for output configurations that are similar to said current output configuration.

52. The method of claim 1, wherein said desirability comprises:
at least one participant priority that indicates a relative importance of each of at least one conference participant.

53. The method of claim 1, wherein said at least one input device comprises:
at least one document scanning device;
wherein said at least one input signal comprises a scanned document representation produced by said at least one document scanning device;
wherein said at least one output device comprises at least one document production device that is capable of producing a document from said scanned document representation;
wherein said at least one sensor comprises at least one detector that indicates a completed acquisition of said scanned document representation;
wherein said determining step comprises the step of, upon said at least one detector indicating said completed acquisition, determining a most desirable destination document production device among said at least one document reproduction device; and
wherein said providing step comprises the step of providing said scanned document representation to said destination document production device.

54. The method of claim 53, wherein said at least one document scanning device comprises at least one digital document scanner, said scanned document representation is a digitally scanned document, and said at least one document production device comprises at least one printer.

55. An apparatus for conferencing, comprising:
at least one input for receiving at least one input signal from at least one input device;
at least one sensor for receiving descriptive information during a conference;
a processor for determining, in a substantially continuous manner, based on said descriptive information, a desirability for each of a plurality of possible output configurations, each of said possible output configurations specifying a routing of at least one output signal to at least one output device;
said processor selecting a most desirable output configuration among said plurality of possible output configurations;
at least one output for providing said at least one output signal to said at least one output device in accordance with said most desirable output configuration;
wherein said desirability is evaluated numerically and wherein said desirability comprises:
a plurality of components, wherein each of said components is multiplied by a component weighting and then additively combined with all other of said components to yield said desirability, and wherein said component weighting indicates a relative importance of said each of said components in determining said desirability.

56. The apparatus of claim 55, wherein said at least one output signal comprises is composed from at least one selected Input signal.

57. The apparatus of claim 55, wherein said descriptive information received from said at least one sensor comprises information indicating any of:
   temperature;
   humidity;
   illumination level;
   an opening of a door;
   a presence of a conference participant in an entryway;
   a presence of a conference participant within a conference site;
   a change in a security level of said conference, said security level defined by a lowest security level among all conference participants;
   a seating of a conference participant;
   a standing up of a conference participant;
   a completed scanning of a document by a facsimile machine;
   an activity of a microphone input;
   a speaking activity of a conference participant;
   a speaking of a predetermined word by a conference participant;
   a posture of a conference participant;
   a gaze direction of a conference participant;
   a facial expression of a conference participant; and
   a gesture by a conference participant.

58. The apparatus of claim 55, wherein said descriptive information received from said at least one sensor comprises information indicating any of:
   which of said at least one output signal are currently provided to said at least one output device;
   which of said at least one output signal were recently provided to said at least one output device;
   which of said possible output configurations is currently selected; and
   which of said possible output configurations were recently selected.

59. The apparatus of claim 55, wherein said most desirable output configuration has a greatest numerical desirability among said possible output configurations.

60. The apparatus of claim 55, wherein said desirability comprises an activity component comprising at least one activity term indicating a relevance of said descriptive information to each of said possible output configurations.

61. The apparatus of claim 60, wherein each of said at least one activity term is multiplied by an activity term weighting and then additively combined with all other of said at least one activity term to yield said activity component, and
   wherein said activity term weighting indicates a relative importance of said each of said at least one activity term in determining said activity component.

62. The apparatus of claim 60, wherein each of said at least one activity term comprises:
   a mapping of said descriptive information onto said possible output configurations.

63. The apparatus of claim 62, wherein said descriptive information comprises:
   an activity vector;
   wherein said mapping comprises a matrix that contains elements which are arranged in at least one row and at least one column, wherein each of said at least one row corresponds to one of said possible output configurations and each of said at least one column corresponds to an element of said activity vector; and
   wherein said mapping is performed by multiplying said matrix by said activity vector.

64. The apparatus of claim 55,
   wherein said at least one input device comprises at least one video camera having a visible range;
   wherein said at least one sensor comprises at least one microphone having an audible range;
   wherein said at least one input signal comprises at least one video signal that is received from said at least one video camera;
   wherein said descriptive information comprises at least one microphone activity level that identifies an activity level of said at least one microphone;
   wherein said possible output configurations provide at least one video signal to at least one output device; and further comprising:
   an audibility mapping that indicates an extent to which said audible range of each of said at least one microphone corresponds to said visible range of each of said at least one video camera.

65. The apparatus of claim 64, further comprising:
   an audio activity term that indicates a greater desirability for output configurations that incorporate output signals composed at least in part from video signals that correspond, as indicated by said audibility mapping, to active microphones.

66. The apparatus of claim 65, wherein said descriptive information further indicates which of said at least one output signal are currently provided to which of said at least one output device;
   wherein said at least one activity term comprises an audio undercoverage term that indicates an increasing desirability for output configurations that incorporate output signals that are composed at least in part from a video signal that corresponds, as indicated by said audibility mapping, to active microphones, and that are not currently provided to at least one output device.

67. The apparatus of claim 65, wherein said descriptive information further indicates which of said at least one output signal are currently provided to which of said at least one output device;
   wherein said at least one activity term comprises an audio overcoverage term which indicates a decreasing desirability for output configurations that incorporate output signals that are composed at least in part from a video signal that corresponds, as indicated by said audibility mapping, to inactive microphones, and that are currently provided to at least one output device.

68. The apparatus of claim 55, wherein said descriptive information further indicates which of said at least one output signal are currently provided to which of said at least one output device; and
   wherein said desirability comprises a saturation component that indicates an increasing desirability for output configurations that incorporate output signals that are not currently provided to at least one output device, and that indicate a decreasing desirability for output configurations that incorporate output signals currently provided to at least one output device.

69. The apparatus of claim 68, wherein said at least one input device comprises at least one video camera;
- wherein said at least one input signal comprises at least one video signal received from said at least one video camera;
- wherein said possible output configurations comprise providing at least one video signal to at least one output device;
- wherein said saturation component increases for output configurations that incorporate at least one video signal currently provided to at least one output device; and
- said saturation component decreases for output configurations that do not incorporate at least one video signal currently provided to at least one output device.

70. The apparatus of claim 55, further comprising:
- at least one continuity term that is multiplied by a continuity term weighting and then is additively combined with any other of said at least one continuity term to yield a continuity component; and
- wherein said continuity term weighting indicates a relative importance of said each of said at least one continuity term in determining said continuity component.

71. The apparatus of claim 70, wherein said descriptive information comprises:
- a history of recently provided output configurations; and
- wherein said at least one continuity term comprises a context continuity term that indicates a greeter desirability for said recently provided output configurations.

72. The apparatus of claim 70, wherein said at least one continuity term comprises:
- a rapid switching continuity tern, that indicates a greater desirability for said current output configuration and a lesser desirability for all other of said possible output configurations; and
- wherein said greater desirability exceeds said lesser desirability by an amount that attains a maximum value immediately upon selection of said current output configuration and that decays thereafter.

73. The apparatus of claim 72, wherein said descriptive information further comprises:
- a recent history switching rate that reflects a time averaged rate at which output configurations that differ from said current output configuration are selected;
- wherein said at least one continuity term comprises a sustained switching continuity term that indicates a greater desirability for said current output configuration and a lesser desirability for all other of said possible output configurations; and
- wherein said greater desirability exceeds said lesser desirability by an amount that is proportional to said recent history switching rate.

74. The apparatus of claim 55, wherein said at least one input device comprises:
- at least one document scanning device;
- wherein said at least one input signal comprises a scanned document representation produced by said at least one document scanning device;
- wherein said at least one output device comprises at least one document production device that is capable of producing a document from said scanned document representation;
- wherein said at least one sensor comprises at least one detector that indicates a completed acquisition of said scanned document representation;
- wherein said processor, upon said at least one detector indicating said completed acquisition, determines a most desirable destination document production device among said at least one document reproduction device; and
- wherein said processor provides said scanned document representation to said destination document production device.

75. An apparatus for routing at least one output signal to at least one output device comprising:
- at least on input for continuously receiving at least one input signal obtained from at least one input device;
- at least one sensor for continuously receiving descriptive information;
- a processor for determining, based on said descriptive information, a desirability for each of a plurality of possible output configurations, each possible output configuration specifying said routing; and
- at least one output for providing said output signals to said output device in accordance with a most desirable output configuration among said possible output configurations;
- wherein said desirability is evaluated numerically and wherein said desirability comprises:
- a plurality of components;
- wherein each of said components is multiplied by a component weighting and then additively combined with all other of said components to yield said desirability, and
- wherein said component weighting indicates a relative importance of said each of said components in determining said desirability.

76. The apparatus of claim 75, wherein said apparatus produces any of:
- a live broadcast television production;
- an edited version of a movie filmed with a plurality of movie cameras and recorded with a plurality of microphones;
- an edited version of a television program originally recorded with a plurality of television cameras and recorded with a plurality of microphones;
- a master security video signal from a plurality of security camera signals;
- a personalized selection of television programming from a cable television tuning device; and
- a video and musical program.

77. A method for routing at least one output signal to at least one output device comprising the steps of:
- continuously receiving at least one input signal obtained from at least one input device;
- continuously receiving descriptive information from at least one sensor;
- determining, based on said descriptive information, a desirability for each of a plurality of possible output configurations, each possible output configuration specifying said routing; and
- providing said output signals to said output device in accordance with a most desirable output configuration among said possible output configurations;
    - wherein said desirability is evaluated numerically and wherein said desirability comprises:
- a plurality of components;
- wherein each of said components is multiplied by a component weighting and then additively combined with all other of said components to yield said desirability, and wherein said component weighting indicates a relative importance of said each of said components in determining said desirability.

78. The method of claim 77, wherein said method is used to produce any of:
- a live broadcast television production;
- an edited version of a movie filmed with a plurality of movie cameras and recorded with a plurality of microphones;
- an edited version of a television program originally recorded with a plurality of television cameras and recorded with a plurality of microphones;
- a master security video signal from a plurality of security camera signals;
- a personalized selection of television programming from a cable television tuning device; and
- a video and musical program.

79. A method for conferencing, comprising the steps of:
- receiving at least one input signal from at least one input device;
- receiving descriptive information during a conference from at least one sensor;
- determining, in a substantially continuous manner, based on said descriptive information, a desirability for each of a plurality of possible output configurations, wherein said desirability is evaluated numerically, each of said possible output configurations specifying a routing of at least one output signal to at least one output device;
- selecting a most desirable output configuration among said plurality of possible output configurations; and
- providing said at least one output signal to said at least one output device in accordance with said most desirable output configuration;
- wherein said descriptive information received from said at least one sensor comprises information indicating any of:
- which of said at least one output signal are currently provided to said at least one output device;
- which of said at least one output signal were recently provided to said at least one output device;
- which of said possible output configurations is currently selected; and
- which of said possible output configurations were recently selected.

* * * * *